United States Patent
Rodríguez Gómez

(10) Patent No.: US 12,257,532 B2
(45) Date of Patent: Mar. 25, 2025

(54) LAMELLA AND LAMELLAR MODULE FOR CLARIFIER

(71) Applicant: Wssdynamics, S.L., Alcorcón (ES)

(72) Inventor: Pedro Roberto Rodríguez Gómez, Alcorcón (ES)

(73) Assignee: Wssdynamics, S.L., Alcorcón (ES)

( * ) Notice: Subject to any disclaimer, the term of this patent is extended or adjusted under 35 U.S.C. 154(b) by 0 days.

(21) Appl. No.: 18/695,863

(22) PCT Filed: Jul. 27, 2022

(86) PCT No.: PCT/ES2022/070495
§ 371 (c)(1),
(2) Date: Mar. 27, 2024

(87) PCT Pub. No.: WO2023/052660
PCT Pub. Date: Apr. 6, 2023

(65) Prior Publication Data
US 2024/0399273 A1 Dec. 5, 2024

(30) Foreign Application Priority Data
Sep. 30, 2021 (ES) ............... ES202130915

(51) Int. Cl.
*B01D 21/00* (2006.01)

(52) U.S. Cl.
CPC ....... *B01D 21/0042* (2013.01); *B01D 21/003* (2013.01); *B01D 21/0066* (2013.01)

(58) Field of Classification Search
CPC ............ B01D 21/0042; B01D 21/0066; B01D 21/0069
See application file for complete search history.

(56) References Cited

U.S. PATENT DOCUMENTS

| 4,921,609 A | 5/1990 | Fromson |
| 11,247,146 B2 | 2/2022 | Rodriguez Gomez |

FOREIGN PATENT DOCUMENTS

| ES | 2744323 A1 | 2/2018 |
| ES | 2912046 A1 | 5/2022 |
| FR | 3043089 A1 | 5/2017 |

*Primary Examiner* — Bradley R Spies
(74) *Attorney, Agent, or Firm* — The Webb Law Firm

(57) ABSTRACT

A lamella for a clarifier, including a plate provided with longitudinal straight ribs extending from the top part of the plate to the bottom edge, and longitudinal straight folds provided with wings and which are interposed between each pair of ribs to form projections with V-shaped walls that project in the sagittal direction. A top transverse fold provided in the top part, which defines a flat portion extending backwards towards a top edge. A bottom transverse fold that curves the bottom part backwards.

18 Claims, 8 Drawing Sheets

LAMELLA AND LAMELLAR MODULE FOR CLARIFIER

CROSS-REFERENCE TO RELATED APPLICATIONS

This application is the United States national phase of International Application No. PCT/ES2022/070495 filed Jul. 27, 2022, and claims priority to Spanish Patent Application No. P202130915 filed Sep. 30, 2021, the disclosures of which are hereby incorporated by reference in their entireties.

BACKGROUND OF THE INVENTION

Field of the Invention

The present invention belongs to the technical field of devices and installations for the treatment of effluents contaminated by impurities in the form of suspended solids, for example and without limitation, in wastewater treatment plants and drinking water treatment plants.

More specifically, the object of the invention is a lamella intended to be used in a lamella clarifier, as well as a lamellar module intended to be used in a lamella clarifier.

Description of Related Art

A clarifier is a device which is usually used in processes for purifying effluents (i.e., liquids flowing in an industrial installation) for removing suspended solid impurities present in said effluents and, particularly, in the purification of wastewater and treatment of water for consumption.

The clarifiers of interest in the present invention are of the "lamellar" type and are provided with lamellar modules, for the purpose of increasing the performance thereof. The incorporation of said lamellar modules in a clarifier enables the effluent flow rate to be treated to be increased or the solid clarification efficiency to be increased.

The lamellae are plates or profiles that, arranged in parallel, define a series of channels. The lamellae are installed inside the clarifier tank at an intermediate height and covering the entire surface of the tank, usually with an inclined orientation, forming an angle of between 45° and 65° relative to the horizontal.

Since the water enters the clarifier from the bottom part of the tank below the lamellae and the treated water is discharged through the top part of the tank above the lamellae, the water must circulate through the inclined channels formed by the lamellae. This inclination generates an accumulation of solids present in the water on the underside of each lamellar channel, accelerating their clarification towards the bottom of the tank where they will be discharged. The water, now free of a large portion of the solids, leaves the lamellar channels through the top area thereof in the direction of the spillway channels through which it exits the tank to continue with the treatment process.

The main problem with lamellar clarifiers and the main reason why their efficiency decreases is the impossibility of achieving a homogeneous upward flow through each and every one of the installed lamellar channels.

For the lamellae to suitably fulfil their function, the flow through said lamellae must be as homogeneous as possible over the entire installed surface, in other words, the ascending speeds in each installed lamellar channel must be the same in all of them. The theoretical speed of passage through the lamellar channels will be given by the effluent flow rate into the tank divided by the installed lamellar surface area, which would be the speed at which the solids have enough time to reach the underside of the lamellar channel. However, in practice this situation almost never occurs. Since the inlets for the effluent input must be made at specific points in the bottom side areas of the tank, the direction of these inlet flows is parallel to the surface of the tank, and subsequently they have to change their direction upwards, cross the lamellae and find the discharge channels. Due to the inertia present in all effluents subjected to speed, this means that there is always a tendency for certain areas of lamellae to receive a greater flow, generating ascending speeds through the lamellae installed in these areas that are much higher than the theoretical design speeds.

Furthermore, the support systems on which the lamellae or lamella modules are fixed are usually made using profiles and load-bearing beams that will provide the necessary strength. Depending on their geometry and sizing, the surfaces of these support systems will be an obstacle to the passage of the flows that occur under the lamellar modules, acting as deflectors, and generating areas where the lamellar channels work with very high ascending speeds.

Thus, it is common to find ascending speeds between 3 and 7 times the design speed in these preferential areas. This means that the solids do not have time to clarify in these areas, leaving the lamellar channels through the top outlet thereof, which results in very high efficiency loss and premature fouling. Given the uniform discharge of water through the spillway channels, the water that flows through the preferential areas, once it has passed the lamellar channels, follows horizontal paths over the lamellar installation to be discharged through the corresponding spillway channel area. Efficiency loss is due to the part of the suspended solids that are discharged with the treated water through the spillway channels, and the premature fouling is due to the part of the solids that are deposited on the lamellar packages and the structures thereof during these horizontal paths.

In most cases, the lamellar clarification tanks have areas where the lamellae, instead of having an upward flow, do not exhibit any flow, or even have a downward flow to compensate for the excess flow running through the preferential areas.

Efficiency losses due to these imbalances in the speeds of passage through the different lamellar areas can be very high, with the most common values being between 40 and 60% of performance loss. In other words, it clarifies 40-60% of the solids that should be clarified according to the theoretical design at homogeneous speeds.

Moreover, since premature fouling is generated, the tanks must be stopped more frequently to be cleaned, which reduces the total capacity of the treatment plant and increases maintenance costs.

New lamellae have been recently developed which geometry is specifically designed to solve the aforementioned problems, such as, for example, those disclosed by Spanish patent No. P201830839, held by this same applicant and which relates to a "lamella for clarifier and a lamellar module for clarifier".

Although the lamellae and lamellar modules described in P201830839 effectively address various problems present in common technologies, as described in the corresponding patent, they do not completely eliminate efficiency losses due to the unequal distribution of ascending speeds through the different areas of the installed lamellae.

Furthermore, other devices have also been developed to address the aforementioned problems, such as those disclosed, for example, in patent No. P202031173, which is also held by this same applicant and relates to "a flow balancing and sunscreen device for lamellar clarifiers".

The flow balancing devices disclosed by P202031173 aim to solve the problems of speed imbalances in lamellar clarifiers, as well as provide the modules with protection against sunlight.

This invention effectively solves the problem of solar radiation on the lamellar modules, but does not completely and definitively eliminate the flow imbalances through the different areas of the lamellar clarifier. Therefore, in order for said balancing device to achieve an optimal balance, it would be suitable to increase the pressure drop during the passage of water, which is a feature of the same.

Furthermore, since it is an additional part, it entails an extra manufacturing and assembly cost for the lamellar modules.

On the other hand, the lamellar modules, object of patent P201830839, exhibit continuous channels in a transverse direction delimited by each of the lamellae that make it up, improving the hydraulic performance that is produced due to the speed gradient inside the channel. In clarifier tanks with a water distribution with flows in the longitudinal direction of the tank and therefore perpendicular to the direction of the channels, the assembly formed by a module according to patent P201830839 and a balancer according to application P202031173 exhibits good performance, reducing the differences between maximum and minimum speeds and therefore clearly improving the efficiency of the clarifier.

On the other hand, when the water distribution is transverse to the tank, the water rises at a higher speed through the lamellae located in the preferential flow areas, reaches the balancer and this balancer diverts part of that flow through the bottom area thereof and high area of the module in the transverse direction of the channels. In this situation, the effect achieved with the balancer decreases and the improvements in efficiency are smaller.

Likewise, in some lamellar clarifier installations, the balancer according to document P202031173 does not always manage to achieve, by itself, the pressure drop required to sufficiently balance the ascending speeds through all the installed lamellae, and therefore, be able to eliminate the spillway channels.

Another aspect to improve, in any lamellar clarification technology in general, are the performance losses due to the transition length that occurs at the inlet of each lamellar channel. Depending on the speed and angle with which the distribution flow under the lamellae reaches the inlet to the lamellar channel, turbulence may occur that lasts for a certain distance of the total length of each lamellar channel, until the laminar regime is stabilised with completely parallel flow lines inside the duct. Clarification in the lamellar duct is efficient only when this last condition is met; therefore, there may be a certain length of the channel from its inlet where the efficiency is not high enough. Depending on the inlet speeds, the angle of incidence, and the geometry of the channel, this transition distance can be extended by 10 to 40% of the total length of the lamellar channel.

Furthermore, the inlet area of the lamellar channel accumulates the solids that have been grouped along the entire length of the channel in the discharge process thereof and therefore the section thereof that is available for the inlet of the effluent is reduced. This increases the speeds of the effluent at the inlet, the turbulence and again contributes to extending the aforementioned transition length longer than necessary. Likewise, this accumulation of solids in the bottom part of the channel and the aforementioned increase in speed favour the entrainment by the upward flow of part of the solids present in this area.

The lamella and lamellar module according to patent P201830839, used together with the flow balancing and sunscreen device according to document P202031173, exhibit good performance in installations with longitudinal water distribution and wherein the imbalances are not excessively pronounced, being very suitable for small and medium-sized clarifiers. On the other hand, the desirable efficiency objectives are not achieved in large-sized tanks that exhibit high speed imbalances between the different areas thereof.

As for fouling, the performance of the lamella and lamellar module according to patent P201830839 is optimal given the longitudinal curvature thereof, but on the other hand, in installations where high speeds occur in certain areas due to the aforementioned imbalances, the transition lengths can extend longer than necessary. Under these conditions, a more pronounced efficiency loss occurs because this first part of the lamellar channel is the one that, due to its smaller angle of inclination relative to the horizontal, contributes the most capacity to the system.

In conclusion, the developments disclosed in documents P201830839 and P202031173 are very suitable for installations with certain features, generally for small and medium-sized clarifiers that usually exhibit less pronounced imbalances. However, in the case of large-sized facilities that exhibit very pronounced imbalances in water distribution, their results are not so promising, which is why there is still a need to develop lamellar clarification devices that achieve the desirable capacity and efficiency objectives, as well as be able to do without the spillway channels.

SUMMARY OF THE INVENTION

The present invention intends to correct or reduce the problems of the aforementioned technique, as well as provide additional advantages to the technology.

The design thereof also has the necessary features to ensure and optimise the operation of automatic cleaning equipment, according to patent P201530891.

To this end, a first object of the present invention relates to a lamella for a clarifier comprising a rectangular or square plate, made of a single piece, characterised in that the plate is provided with:
  a plurality of longitudinal straight ribs running from the top part of the plate to the bottom edge thereof,
  a plurality of longitudinal straight folds, each of the straight folds extending from the top part of the plate to the bottom edge thereof and each of said straight folds being interposed between a pair of longitudinal ribs, so that the space comprised between said pair of longitudinal ribs defines a projection with V-shaped walls that projects forward in the sagittal direction and on which corner the longitudinal straight fold is located;
  a plurality of wings, one wing being arranged on the front part, in the sagittal direction, of each longitudinal straight fold and one wing further being arranged on the rear part, in the sagittal direction, of each longitudinal straight fold;
  four end wings; one end wing being arranged on the front part, in the sagittal direction, of each of the longitudinal edges of the plate and one end wing further being arranged on the rear part, in the sagittal direction, of each of the longitudinal edges of the plate;
  a top transverse fold provided in the top part of the plate and defining a flat portion extending backwards in the sagittal direction a constant distance from the fold point to the top edge of the plate; and a bottom transverse fold provided in the bottom part of the plate, such that said bottom part is curved backwards in the sagittal direction.

Due to the particular design of these lamellae for a clarifier according to the present invention and which incorporate a flow homogenisation system in their own structure, it is possible to significantly reduce the speed differences in the different lamellar channels, regardless of whether they are located in a preferential flow area. Therefore, areas with lamellar channels working at very low or negative speeds are also avoided.

Furthermore, and given that the wings form channels independent of each other throughout the width of the lamellar module, the flows from the preferential areas are prevented from ascending at a higher speed and then moving through the high area of the module and under the homogenisation system.

In this way, in the lamellar installations formed by lamellar modules according to the present invention, improved performance is achieved regardless of the type of distribution of effluent to be clarified, whether longitudinal from the head of the tank or transverse from the sides of the tank, and moreover, the sufficient balance of the flows through the incorporated homogenisation system will allow the spillway channels to be eliminated, since homogeneous extraction of water will no longer be necessary to achieve said balance.

This makes it possible for all the lamellar channels to work at speeds close to the average design speed, so that the solids present in the water will have time to reach the underside of each lamellar channel, grouping together and leaving the lamellar channel through the bottom opening thereof towards the base of the clarifier. In this way, the lamellar installation will operate with efficiency values close to the design values.

By preventing the existence of channels that work at high speeds, the possibility of some solids leaving the channels through the top part thereof is reduced, generating the usual efficiency losses and premature fouling that occurs when part of these solids are deposited on the top surfaces of the lamellar installation. This reduces the maintenance and cleaning tasks of the lamellae.

Furthermore, given the lamellae of the present invention, regardless of the orientation with which the effluent distribution flows under the lamellar package reach the inlet of the lamellar channels, it is possible to reduce the turbulence that occurs by shortening the transition length to establish a stable laminar flow with parallel flow lines. These turbulences and therefore the transition length are directly proportional to the inlet speed to the lamellar channel; therefore, by reducing the inlet speeds that would occur in the channels located in the preferential areas, the transition length associated with the inlet speed is also reduced, optimising the performance of all the channels and reducing efficiency losses associated with the transition length.

Likewise, the greater inclination relative to the horizontal of the lamellar channels in the inlet area will prevent the transition area from extending beyond the bottom fold of the lamella to the working area of the lamellar channel. This greater inclination of the channels will also favour the discharge of the solids in this inlet area, avoiding the accumulations described above, increasing the passage section available for the inlet flow, reducing the speed thereof, the turbulence and reducing the transition length and the entrainment of part of the solids by the flow of the inlet effluent.

In a preferred embodiment of the lamella according to the invention, both the wings, provided on the longitudinal straight folds, and the end wings, provided on the longitudinal edges, extend from the top part of the plate to the bottom edge thereof.

On the other hand, the single-piece plate is preferably a plastic plate manufactured using plastic injection technology.

Polypropylene (PP), acrylonitrile butadiene styrene (ABS), polystyrene (PS), recycled plastics or combinations thereof are non-limiting examples of preferred plastic materials for manufacturing the single-piece plates of the lamellae according to the present invention.

In this sense, it is important to note point out that neither plastic extrusion nor plastic thermoforming would allow the lamella to be equipped with complex geometries such as those described in the present invention. Equipping the lamella with different thicknesses, perforations, longitudinal folds plus transverse folds, ribs in different locations, etc. is impossible for the aforementioned technologies, which are those present in the state of the art.

In a preferred embodiment of the invention, the lamella comprises at least one longitudinal straight structural fold provided with wings and running from the top part of the plate to the bottom edge thereof, said structural fold being interposed between a pair of longitudinal straight ribs, so that the space comprised between said pair of longitudinal ribs defines a structural projection with V-shaped walls that projects forward in the sagittal direction and on which corner the structural fold is located, the angle defined by the V-shaped walls of the structural projection being more acute than the angle defined by the walls of a conventional projection in order to provide the necessary mechanical strength.

The structural fold is preferably equipped with greater thickness and with at least one anchoring point that comprises a perforation intended to house a supporting element. Said perforation is preferably conical.

In a preferred embodiment of the invention, the lamella comprises at least one structural fold equipped with a top anchoring point that comprises a perforation closest to the top transverse fold and a bottom anchoring point that comprises a perforation located in the bottom part thereof and below the bottom transverse fold.

Preferably, the lamella also comprises a plurality of structural wings, one structural wing being arranged on the front part, in the sagittal direction, of each longitudinal straight structural fold and one structural wing being further arranged on the rear part, in the sagittal direction, of each longitudinal straight structural fold.

Furthermore, even more preferably, the flat portion of the top part of the plate is provided, on each of its two longitudinal edges, with a top longitudinal closure.

Likewise, for each of the longitudinal straight ribs of which the plate consists, a V-shaped deflector is preferably provided, said V-shaped deflectors being arranged in the bottom plane of the flat portion of the top transverse fold.

Given the partial overlap of the flat portion of the lamellae, the V-shaped deflectors rest on the top surface of the flat portion of the adjacent lamella and fulfil several functions: on the one hand, they partially close the effluent passage to increase the pressure drop to the values required to achieve flow balance in all the installed modules and improve the clarification process. Furthermore, they allow collecting and channelling the flow generated by the nozzles of automatic cleaning equipment, for example, automatic cleaning equipment such as those disclosed in Spanish patent P201530891.

Said overlap between adjacent lamellae is advantageous, since it also reduces the amount of sunlight that reaches the interior of the lamellar channels, consequently reducing the problems of algae growth and microbiological processes therein.

Even more preferably, the bottom surface of the flat portion of the top transverse fold is provided with a plurality of protrusions, each of said protrusions being aligned with one of the longitudinal straight folds or one of the longitudinal straight structural folds of the plate.

A second aspect of the invention relates to a lamellar module for a clarifier comprising two or more lamellae, according to the first aspect of the invention, arranged in parallel without direct contact with one another and attached to a supporting element.

In a preferred embodiment of the lamellar module for a clarifier according to the present invention, the lamellae are arranged in such a way that:

the bottom part of the plate of each of the lamellae has an inclination of between 65 and 80° relative to the horizontal, and the intermediate part of the plate, comprised between the top transverse fold and the bottom transverse fold, has an inclination between 45 and 65° relative to the horizontal; and the flat portion of the top part of the plate of each of the lamellae forms an angle with the horizontal comprised between 1° and 10°.

The configuration described in the previous paragraph means that the lamellae provided in each lamellar module have the following features:

They are parallel to each other, defining the main longitudinal direction thereof (intermediate area) at an angle of between 45 and 65° relative to the horizontal in the working position thereof;

They define a plurality of independent lamellar channels delimited by the surfaces of the planes on both sides of each longitudinal straight rib and the wings located on the longitudinal folds that complete an intermediate partition therebetween;

Said lamellar channels have in the bottom area thereof, comprised between the bottom edge and the bottom transverse fold, an inclination of between 65 and 80° relative to the horizontal, i.e., greater than in the intermediate area thereof;

In addition, the lamellar channels have side openings in the bottom area thereof and prior to the bottom transverse fold. Openings generated by the wings provided in the longitudinal straight folds, the end wings provided in the longitudinal edges, and, where appropriate, the structural wings provided in the structural folds;

The flat portion defined from the top transverse fold exhibits a small angle (comprised between 1° and 10°) relative to the horizontal, which allows it to overlap with part of the flat portion of the lamella located immediately behind it, incorporating the homogenisation system into its own structure;

This overlap reduces the section available for the passage of water, generating an increase in the speed thereof and therefore the pressure drop thereof, which is why it acts as a flow balance system that is integrated into the lamellar module itself. In addition, it helps protect against solar radiation.

In a preferred embodiment of the invention, the lamellar module is characterised in that:

each of the lamellae is provided with at least one longitudinal structural fold, equipped with a top anchoring point that comprises a perforation closest to the top transverse fold and a bottom anchoring point that comprises a perforation located in the bottom part of said longitudinal structural fold; and in that the supporting element comprises at least two groups of threaded rods, the first group of threaded rods being arranged so that they cross the perforations in the top anchoring point of the lamellae and the second group of threaded rods being arranged so that they cross the perforations in the bottom anchoring point of the lamellae.

Furthermore, the lamellar module also preferably comprises:

at least one top spacer, arranged at a top anchoring point of a lamella, said top spacer being provided with a through hole to allow at least one of the threaded rods of the first group to pass through the same; and at least one bottom spacer, arranged at a bottom anchoring point of a lamella, said bottom spacer being provided with a through hole to allow at least one of the threaded rods of the second group to pass through the same.

These spacers are preferably provided with frustoconical bushings intended to house at least one threaded rod and to be spliced, crossing the lamella, with at least other bushing provided in another adjacent spacer. In the support and fastening area of the spacers with each of the lamellae, said spacers preferably have an inclination that will determine the orientation of each of the lamellae once the lamellar module has been assembled.

Preferably, end pieces will complete the supporting element at each of the ends of the lamellar module, equipping it with a vertical plane perpendicular to the threaded rod that will facilitate the correct support for the tightening means, preferably nuts, that will fix the assembly.

The bottom spacers arranged in the vicinity of the bottom edge of the lamellae are preferably provided with coupling means for coupling to a supporting base.

Said supporting base is intended to be placed inside the tank of a clarifier and, in addition to serving as a base to support the module, it also acts as an anti-flotation device.

In a preferred embodiment of the present invention, the supporting base comprises at least one inverted T-shaped profile where the coupling means for coupling the bottom spacers will be housed.

BRIEF DESCRIPTION OF THE DRAWINGS

The terms FIG., FIGS., Figure, and Figures are used interchangeably in the specification to refer to the corresponding figures in the drawings.

A very brief description of a set of drawings is provided below to make the invention more readily understandable. These drawings are expressly related to an embodiment of said invention and non-limiting examples of the same are provided.

REFERENCE NUMBERS OF THE FIGURES (1) Lamella;
(5) Plate;
(5a) Top part of the lamella;
(5b) Bottom part of the lamella;
(5c) Top edge of the lamella;
(5d) Bottom edge of the lamella;
(10) Longitudinal straight ribs;
(15) Longitudinal straight folds;
(15') Longitudinal straight structural folds;
(20) Top transverse fold;
(20a) Flat portion of the transverse fold;
(30) Projection;
(30') Structural projection;
(40) Wings (provided in the longitudinal straight folds);
(40') Structural wings (provided in the longitudinal straight structural folds);
(40") End wings (provided on the longitudinal edges of the plate);
(50a) Top perforation;
(50b) Bottom perforation;
(60) Bottom transverse fold;
(70) V-shaped deflectors;
(85) Top longitudinal closure
(90) Protrusion;
(100) Lamellar module;
(105a) Top spacer;
(105b) Top spacer;
(110a) Top end;
(110b) Bottom end;
(120) Supporting base;
(130) Coupling means for coupling to the supporting base;
(140a) First group of rods;
(140b) Second group of rods;
(150) Side openings;
(L) Longitudinal direction;
(T) Transverse direction;
(S) Sagittal direction.

DESCRIPTION OF THE INVENTION

Various preferred embodiments of the invention are described below.

Throughout the present description, as well as in the attached figures, the elements with equal or similar functions will be designated with the same reference numbers.

Figure 1:
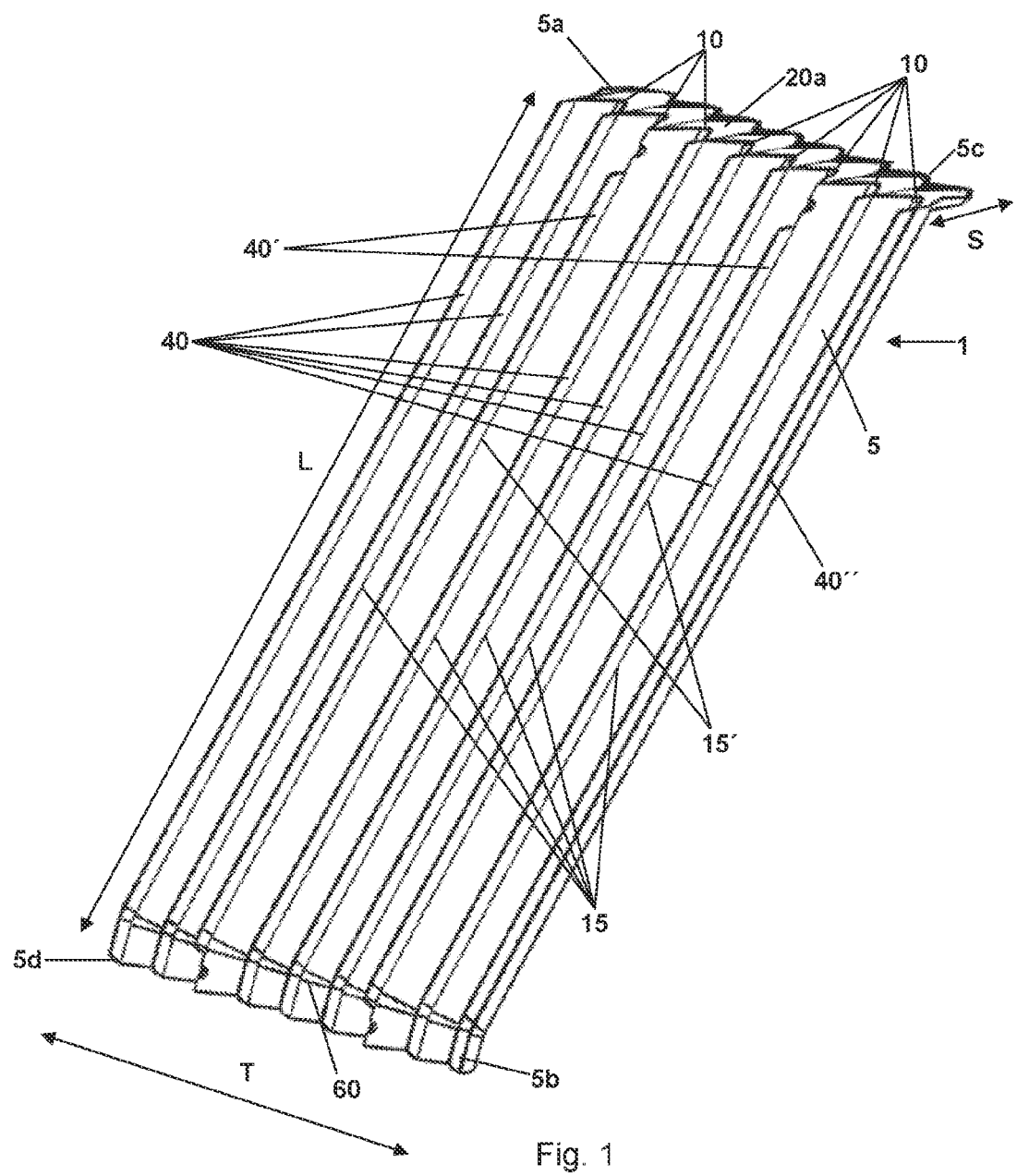
FIG. 1 is a perspective view of a first embodiment of a lamella according to the present invention.

FIG. 1 shows a first embodiment of a lamella (1) according to the present invention. Furthermore, for greater clarity, said figure shows the following directions necessary to describe the object of the invention: longitudinal direction (L), transverse direction (T) and sagittal direction(S).

In the embodiment shown here, said lamella comprises a single-piece rectangular plate (5), equipped with a top part (5a), which ends in a top edge (5c), and a bottom part (5b), which ends in bottom edge (5d). Furthermore, end wings (40") are arranged on each of the two longitudinal edges of the plate (5).

The plate (5) comprises a plurality of longitudinal straight ribs (10) running from the top part (5a) to the bottom edge (5d) thereof.

Likewise, it is provided with longitudinal straight folds (15), extending from the top part (5a) of the plate (5) to the bottom edge (5d). Furthermore, each of the folds (15) is interposed between a pair of longitudinal ribs (10), so that the space comprised between said pair of longitudinal ribs (10) defines a projection (30), or ridge, with V-shaped walls that projects forward in the sagittal direction(S) and on which corner the longitudinal straight fold (15) is located.

Each of the longitudinal straight folds (15) is provided with wings (40) on the fold extending along the entire longitudinal extension thereof.

Likewise, the plate (5) is provided with a top transverse fold (20) provided in the top part (5a) and defining a flat portion (20a). Said flat portion (20a) extends backwards in the sagittal direction(S) a constant distance from the fold point to the top edge (5c) of the plate (5).

Furthermore, the bottom part (5b) of the plate (5) is provided with a bottom transverse fold (60), which curves backwards in the sagittal direction(S), so that when the lamella is in the working position thereof, said bottom part (5b) of the plate forms a greater angle relative to the horizontal than the intermediate part, comprised between the top transverse fold (20) and the bottom transverse fold (60).

In the embodiment shown in FIG. 1, the lamella (1) for a clarifier also comprises longitudinal straight structural folds (15') running from the top part (5a) of the plate (5) to the bottom edge (5d) thereof. Said structural folds (15') are provided with structural wings (40') extending longitudinally over most of the longitudinal extension thereof, except for the periphery of the perforations (50a and 50b).

Each structural fold (15') is interposed between a pair of longitudinal straight ribs (10), so that the space comprised between said pair of longitudinal ribs (10) defines a structural projection (30'), with V-shaped walls, that projects forward in the sagittal direction(S) and on which corner the structural fold (15') is located. The angle defined by the V-shaped walls of the structural projection (30') is more acute than the angle defined by the walls of a conventional projection (30) and has a greater thickness in order to increase the mechanical strength thereof.

In this embodiment of the invention, the structural folds (15') are equipped with a top anchoring point provided with a perforation (50a) and a bottom anchoring point provided with a perforation (50b). The perforations (50a, 50b) are intended to house a rod that is part of the lamellar module supporting element.

Figure 3A:
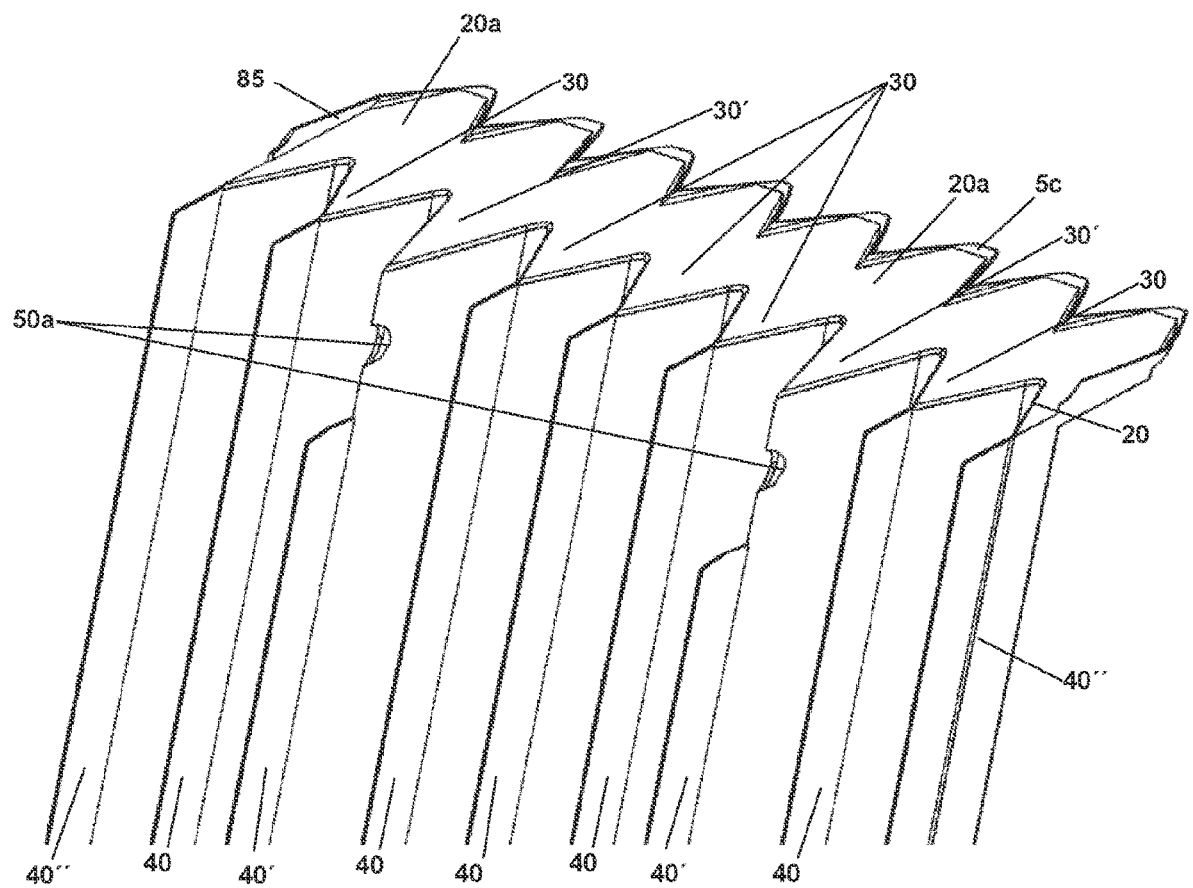
FIGS. 3A and 3B are enlarged views showing the top part and the bottom part, respectively, of the lamella in FIG. 1 in more detail.
Figure 3B:
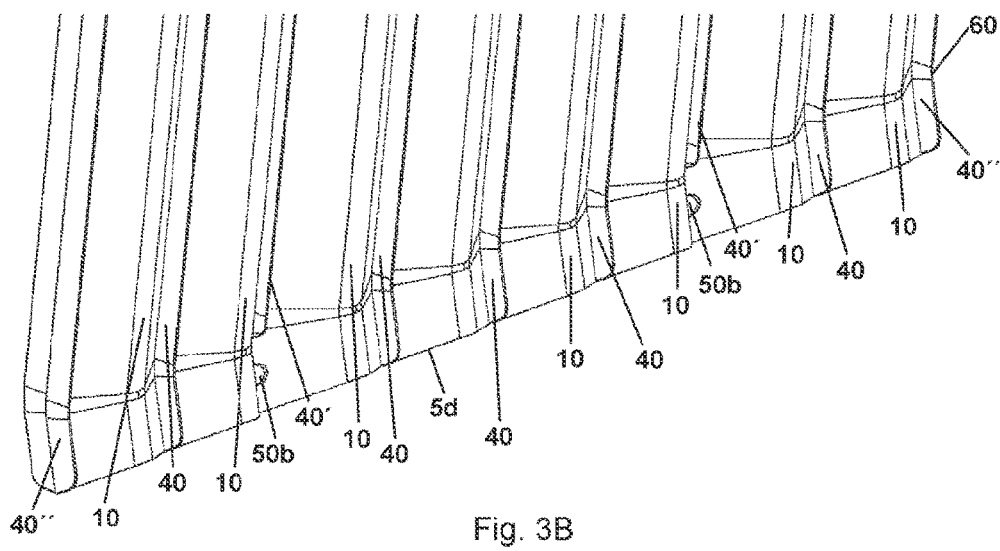

FIGS. 3A and 3B are enlarged views showing the top part and bottom part, respectively, of the lamella in FIG. 1 in more detail.

Thus, for example, FIG. 3A clearly shows both the conventional projections (30) and the structural projections (30') of the lamella, among other elements. Also shown are the top longitudinal closures (85) provided in the flat portion (20a) of the top part (5a).

For its part, FIG. 3B shows with particular clarity, for example, the bottom edge (5d) of the plate and the perforations (50b) corresponding to the bottom anchoring points.

Figure 2:
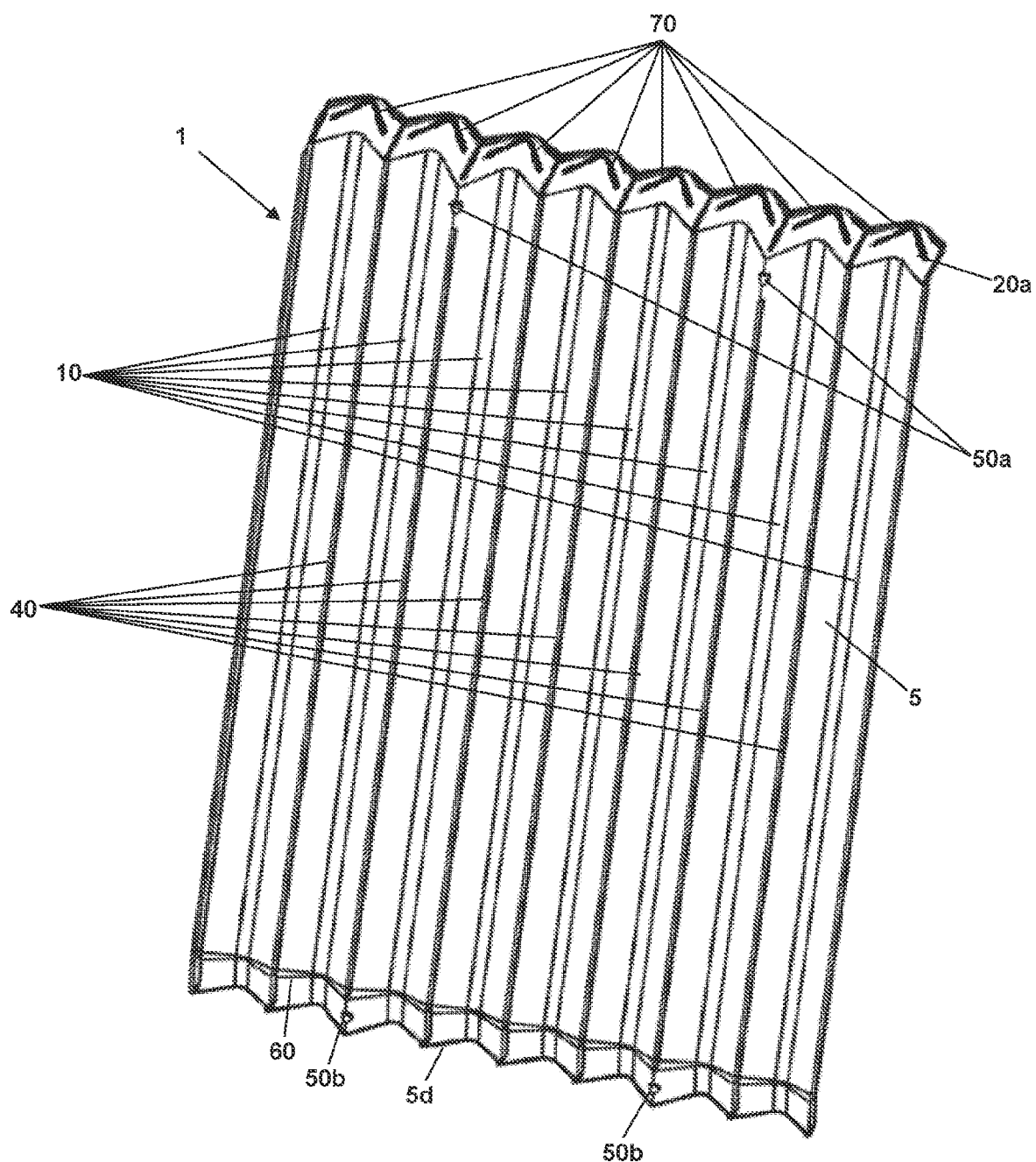
FIG. 2 is a perspective view of a second embodiment of a lamella according to the present invention.

FIG. 2, for its part, is a perspective view of a second embodiment of a lamella (1) according to the present invention, provided with elements very similar to those of the embodiment in FIG. 1. However, FIG. 2 schematically shows the arrangement of the V-shaped deflectors (70) in a preferred embodiment of the invention. Said V-shaped deflectors (70) are located under the bottom surface of the flat portion (20a) of the top transverse fold of the sheet metal and are visible from the perspective represented in FIG. 2.

Figure 4:
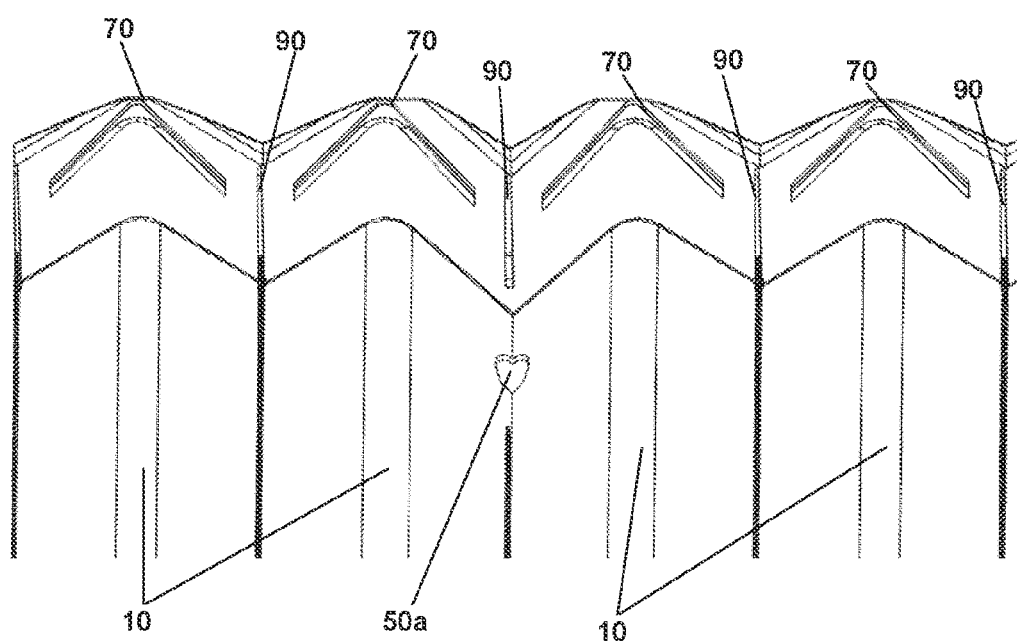
FIG. 4 is an enlarged view showing the top part of an embodiment of a lamella in more detail, in which the flat portion of the top part thereof is provided with V-shaped parts and protrusions to partially close the effluent passage channels.

FIG. 4 shows another embodiment of a lamella according to the present invention, which is also provided with the V-shaped deflectors (70) under the bottom surface of the flat portion (20a) of the top transverse fold of the sheet metal and which, in addition, is equipped with protrusions (90). As will be explained later in detail, both the V-shaped deflectors (70) and the protrusions (90) contemplated in the present invention are intended to partially occlude the lamellar channels to reduce the passage section of water, increase the speed of passage thereof and therefore the pressure drop generated to improve the performance thereof during the clarification process.

FIGS. 5A, 5B, 5C, 5D and 5E show a possible embodiment of a lamellar module (100) for a clarifier according to the invention. The module (100) comprises a plurality of lamellae (1) arranged in parallel, without direct contact with one another.

In the embodiment of the invention shown in said figures, each of the lamellae (1) is provided with two longitudinal structural folds, equipped with a top anchoring point that comprises a perforation (50a) and a bottom anchoring point that comprises a perforation (50b).

The lamellar module (100) further comprises two groups of threaded rods (140a) and (140b) (visible in FIG. 4D). In the assembled and operational condition of the lamellar module, the first group of threaded rods (140a) crosses the perforations (50a) of the top anchoring point of the lamellae (1), while the second group of threaded rods (140b) crosses the perforations (50b) of the bottom anchoring point of the lamellae.

Furthermore, top spacers (105a) are arranged at the top anchoring point between each pair of adjacent lamellae (1). The top spacers (105a) are provided with a through hole equipped with a frustoconical bushing that allows one of the threaded rods (140a) of the first group to be housed therein. As shown in FIG. 5D, respective top end pieces (110a) are arranged in front of the first lamella (1) and behind the last lamella (1) of the lamellar module (100).

Similarly, bottom spacers (105b) are arranged at the bottom anchoring point between each pair of adjacent lamellae (1). The bottom spacers (105b) are also provided with a through hole with a frustoconical bushing that allows one of the threaded rods (140b) of the second group to be housed therein. Likewise, and as shown in FIG. 5D, respective bottom end pieces (110b) are arranged in front of the first lamella (1) and behind the last lamella (1) of the lamellar module (100).

Furthermore, the bottom spacers (105b) are provided with coupling means (130) for coupling to a supporting base (120) in the shape of an inverted T profile, intended to be placed inside the tank of a clarifier and, in addition to serving as a base to support the module, it also acts as an antiflotation device.

These coupling means (130) consist of two pins located in the bottom part of said separator and that will fit into the top part of each inverted T profile. Some perforations in the pins and profile will enable housing a through element that will fix the modules to the supporting profiles. The through elements can be screws or rivets, for example.

Depending on the dimensions of the clarification tank, structural profiles or beams may be required to provide additional strength to the supporting bases or inverted T profiles.

Figure 5A:
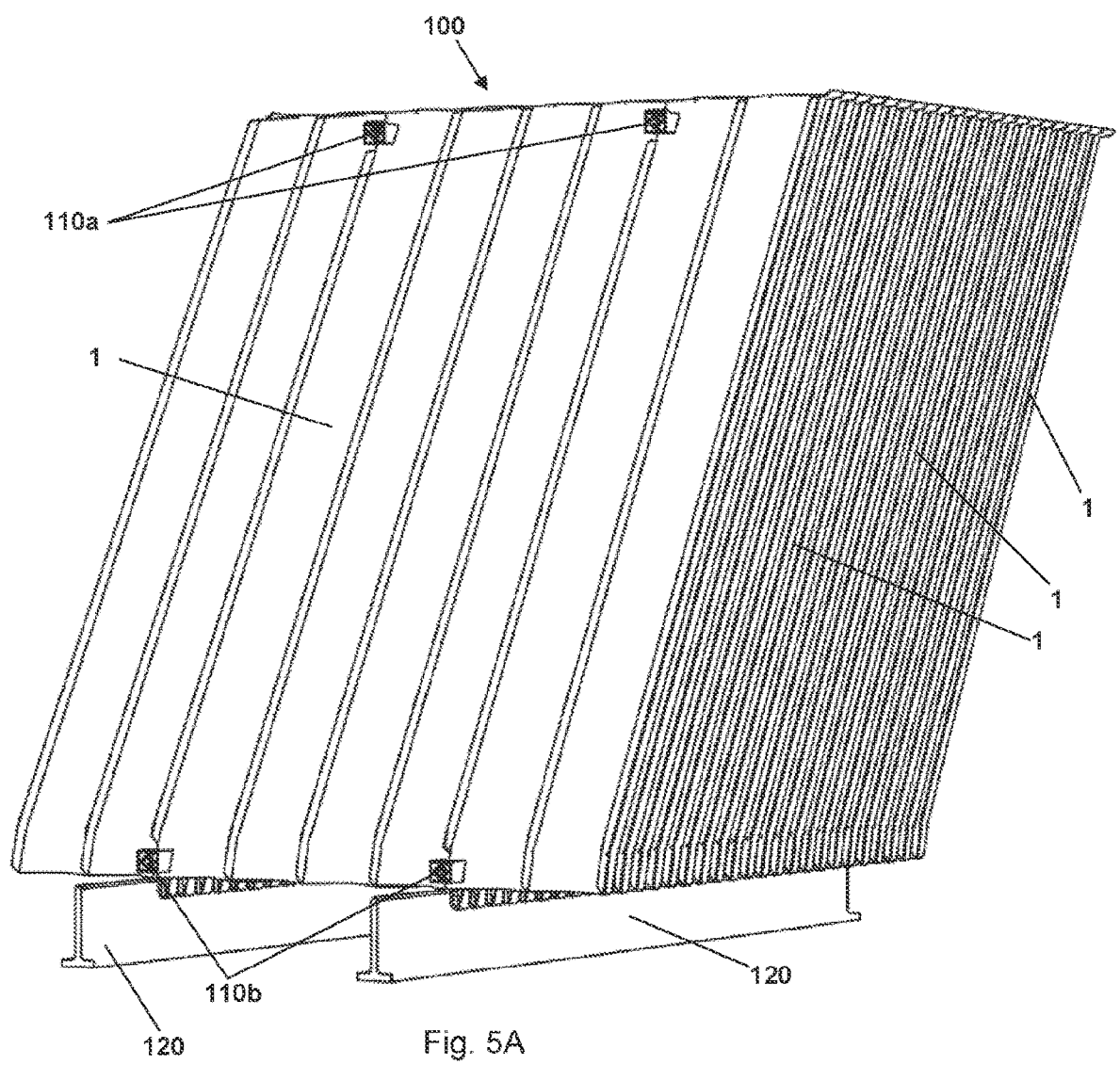
FIG. 5A shows a possible embodiment of a lamellar module according to the present invention.
Figure 5B:
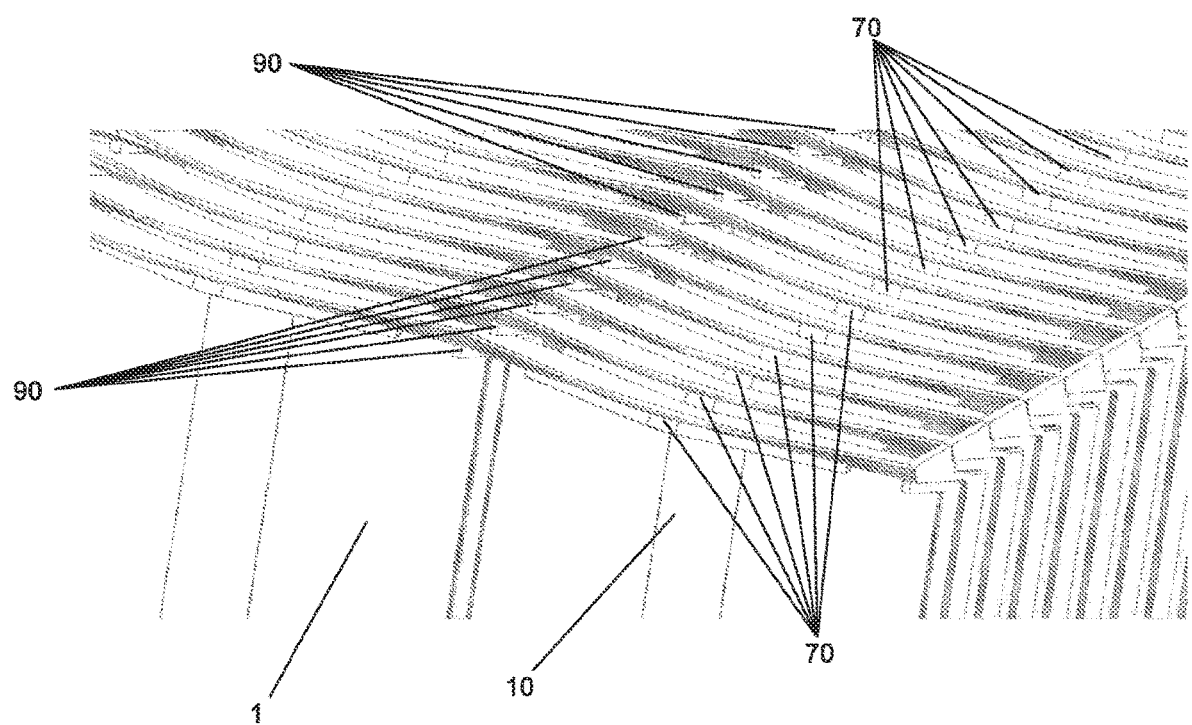
FIGS. 5B and 5C are enlarged views showing the top part and the bottom part, respectively, of the lamellar module in FIG. 5A in more detail.
Figure 5C:
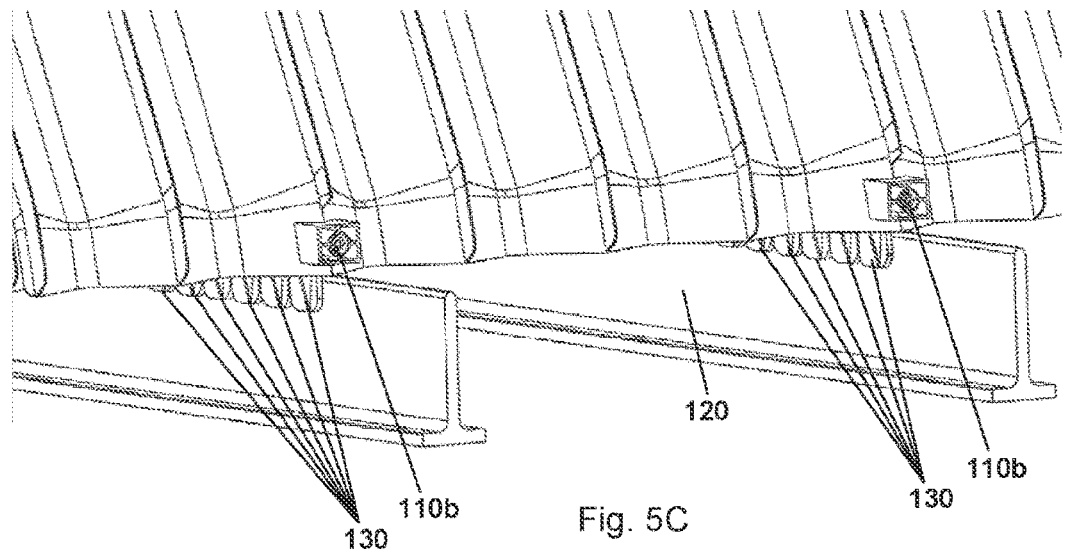
Figure 5D:
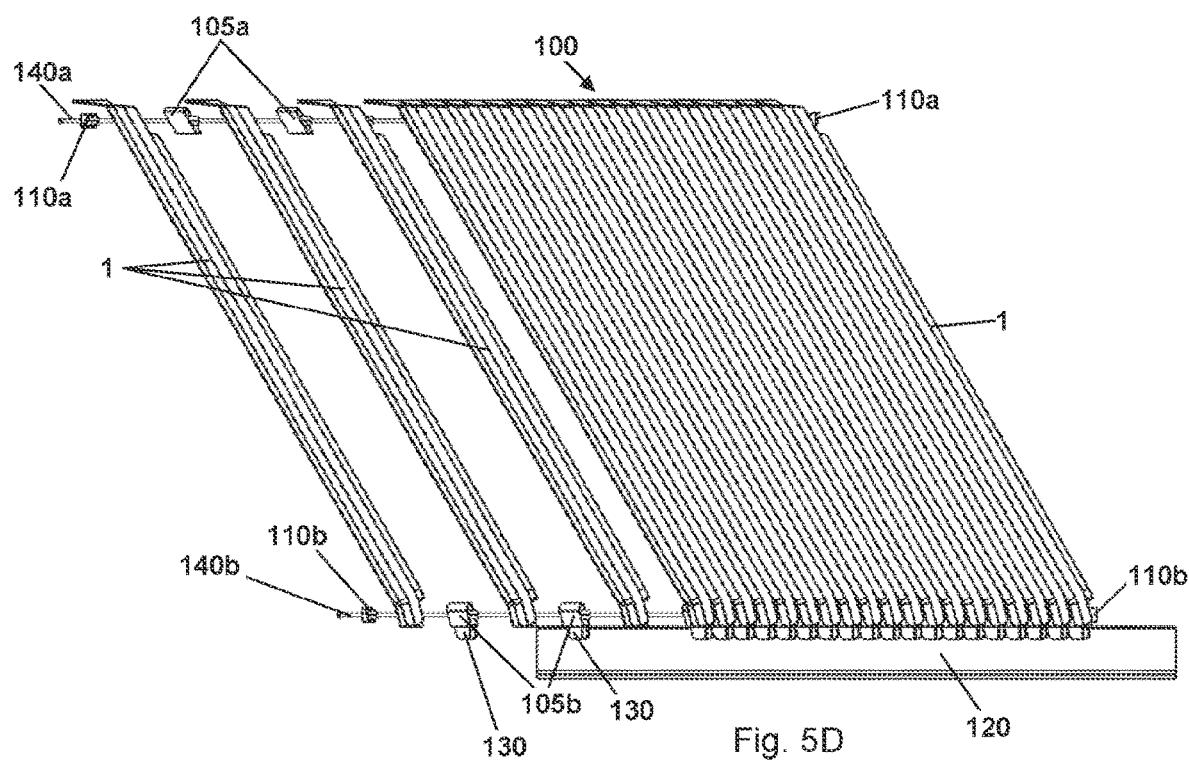
FIG. 5D is a partially exploded side view of the lamellar module in FIG. 5A.
Figure 5E:
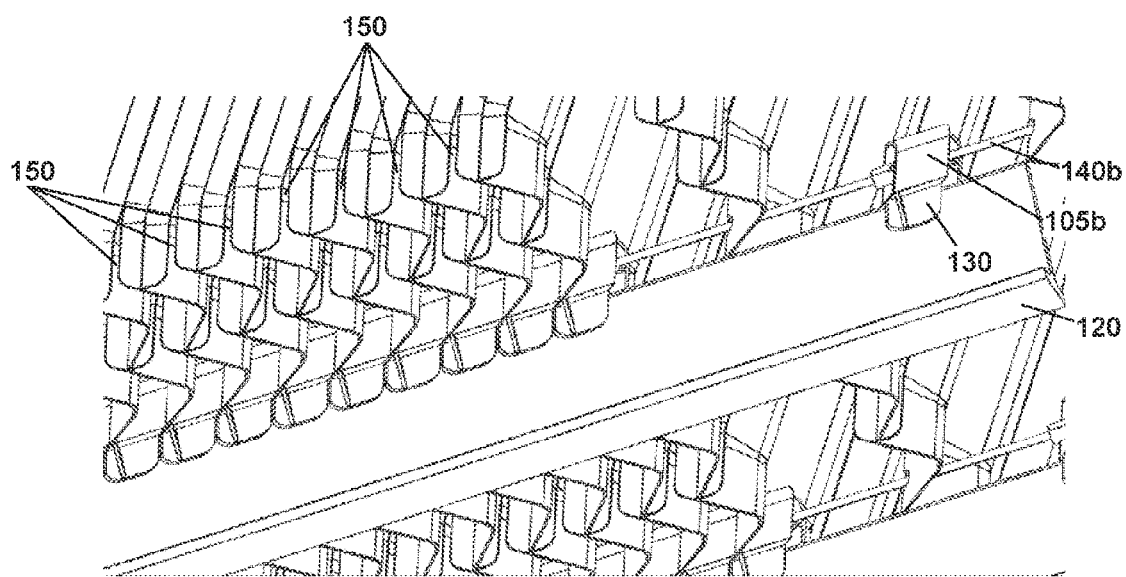
FIG. 5E is an enlarged detail of a bottom view of the lamellar module in FIG. 5A.

FIG. 5E shows how in this embodiment of the lamellar module, side openings (150) are formed in the bottom part of the lamellar channels, due to the fact that the plate of each of the lamellae (5) exhibits, in the bottom part thereof, a greater inclination relative to the horizontal than in the intermediate part thereof.

In the preferred embodiment of the invention shown in FIGS. 5A to 5E, once the lamellar modules (100) are assembled and arranged in the clarification tank, said modules (100) have the following features:

All the lamellae (1) that comprise it are arranged parallel to each other;

The lamellar modules (100) thus formed will have independent lamellar channels delimited by the surfaces of the planes on both sides of each longitudinal rib (10), the wings (40), the structural wings (40') and, where appropriate, the end wings (40"). The geometry of these channels remains constant from the bottom transverse fold (60) to the height of the top transverse fold (20), where the geometry thereof is transformed into a low-section flat channel;

The top flat area (20a) of each lamella will be partially overlapped with the flat area (20a) of the adjacent lamella. Depending on the angle of the top fold, the free distance between the bottom and top planes of each lamella in this overlap area will be between 2 and 6 mm. The overlapping area will preferably extend between 15 and 25 mm;

As shown in detail in FIG. 5B, in each overlapping area, the V-shaped deflector (70) that rests on the top surface of the flat area of the adjacent lamella (1) is housed under the bottom surface of the flat area, generating a closure to the passage of water. Furthermore, between the V-shaped deflectors (70), the protrusions (90) that rest on the top surface of the flat area of the adjacent lamella are housed under the bottom surface of the flat area. Between the V-shaped deflectors (70) and the protrusions (90) that partially close the passage of water in the overlapping area, slots that limit the water passage section are formed, therefore increasing the speed thereof at that point and the pressure drop generated.

Depending on the sizing of the V-shaped deflectors (70) and the separation distance between the overlapping surfaces between the lamellae (1), slots of between 8 mm and 20 mm in length and between 2 mm and 6 mm in height will preferably be formed. However, this sizing may vary depending on the needs of each installation.

The top configuration of the slots is such that each formed channel will have two slots of identical size, so that all the water that flows through the channel must necessarily pass through the assembly of the two slots, at the speed determined by the passage section thereof and generating the pressure drop corresponding to said speed.

The geometry of the partial closure in the form of a continuous slot of variable section that is generated by the V-shaped deflectors (70) and the protrusions housed under the bottom surface of the flat area of each lamella (1) and in its overlapping area with the adjacent lamella generates a pressure drop associated with the sudden narrowing of the passage of water, a pressure drop associated with the very passage through the slot in its narrowest area and a pressure drop associated with the progressive expansion of the flow once it has crossed the slot in its narrowest area. This set of pressure drops will be much higher than the pressure drop required to stop the inertia of the water present in the preferential passage areas. When the high-speed water reaches the lamellar ducts located in the preferential areas, the pressure drop generated at nominal flow in the slots of each channel will prevent the flow from significantly increasing, diverting the flows under the modules towards channels with a tendency to have a lower flow rate and levelling out the ascending speeds in all the installed channels.

The geometry of the closure generated by the V-shaped deflectors and the straight protrusion housed under the bottom surface of the flat area of each lamella and in its overlapping area with the adjacent lamella will facilitate the reception and concentration of the flow that will be generated by the nozzles of the cleaning equipment, channelling the pressurised water propelled by the nozzles in the direction of the passage slot.

By generating independent channels, it prevents water from moving transversely to the lamellar module. This prevents high ascending speeds from occurring in the preferential areas and preventing this flow from moving under the closure system to other areas of the module or adjacent modules when it reaches the top part of the module.

Given the geometry of the lamella, each lamellar channel will be equipped with a section having a greater inclination relative to the horizontal (between 65 and) 80° in the bottom area thereof where the water enters. Turbulence due to the change of direction will mostly occur in this area, reducing the transition distance in which clarification is not effective. Once this area has been passed, the water will continue its rise through the working area of the lamellar channel, in other words, the intermediate area thereof, with a lower inclination relative to the horizontal (between 45 and) 65°, but already exhibiting parallel flow lines typical of a stable laminar regime, increasing the performance of the process. Likewise, and given its greater inclination, this inlet area will favour the discharge of solids, preventing the accumulation thereof at the inlet of the channel, increasing the surface area available for the passage of water, reducing the inlet speed thereof and minimising the entrainment of solids once again in the upward direction.

In this bottom area, the longitudinal wings (40, 40' and 40") are sized so that the lamellar channels are partially open in the side areas. With transverse water distributions or distributions having a transverse component, these openings will allow part of the flow to pass through the opening to the adjacent channel, with low speed and partially laminated, which once again will contribute to reducing inlet turbulence and the ineffective transition area.

Each module (100), in its final placement inside the tank and on the supporting bases (120) thereof, will be aligned with the adjacent module and be perfectly coupled to each other, so that the last lamella of the previously placed module will overlap in the same manner with the first module lamella placed below.

However, the invention should not be limited to the particular embodiment described herein. People skilled in the art may develop other embodiments in light of the description provided herein. Accordingly, the scope of the invention is defined by the following claims.

The invention claimed is:

1. A lamella for a clarifier comprising a rectangular or square plate, made of a single piece, wherein the plate is provided with:
   a plurality of longitudinal straight ribs running from the top part of the plate to the bottom edge thereof,
   a plurality of longitudinal straight folds, each of the folds extending from the top part of the plate to the bottom edge thereof and each of the folds being interposed between a pair of longitudinal ribs, so that the space comprised between the pair of longitudinal ribs defines a projection with V-shaped walls that projects forward in the sagittal direction and on which corner the longitudinal straight fold is located;
   a plurality of wings, one of said plurality of wings being arranged on the front part, in the sagittal direction, of each longitudinal straight fold and another of said plurality of wings further being arranged on the rear part, in the sagittal direction, of each longitudinal straight fold;
   four end wings; one end wing being arranged on the front part, in the sagittal direction, of each of the longitudinal edges of the plate and one end wing further being arranged on the rear part, in the sagittal direction, of each of the longitudinal edges of the plate;
   a top transverse fold provided in the top part of the plate and defining a flat portion extending backwards in the sagittal direction a constant distance from the fold point to the top edge of the plate; and
   a bottom transverse fold provided in the bottom part of the plate, such that the bottom part curves backwards in the sagittal direction.

2. The lamella of claim 1, wherein the wings and the end wings extend from the top part of the plate to the bottom edge thereof.

3. The lamella of claim 1, wherein the plate is a plastic plate manufactured using plastic injection technology.

4. The lamella of claim 2, further comprising at least one longitudinal straight structural fold running from the top part of the plate to the bottom edge thereof, the structural fold being interposed between a pair of longitudinal straight ribs, so that the space comprised between the pair of longitudinal ribs defines a structural projection with V-shaped walls that projects forward in the sagittal direction and on which corner the structural fold is located, the angle defined by the V-shaped walls of the structural projection being more acute than the angle defined by the walls of a conventional projection.

5. The lamella of claim 4, further comprising a plurality of structural wings, one structural wing being arranged on the front part, in the sagittal direction, of each longitudinal straight structural fold and one structural wing being further arranged on the rear part, in the sagittal direction, of each longitudinal straight structural fold.

6. The lamella of claim 4, wherein a structural fold is equipped with at least one anchoring point that comprises a perforation intended to house a supporting element.

7. The lamella of claim 6, wherein at least one structural fold is equipped with a top anchoring point that comprises a perforation closest to the top transverse fold and a bottom anchoring point that comprises a perforation located in the bottom part and below the bottom transverse fold.

8. The lamella of claim 1, wherein the flat portion of the top part is provided, on each of its two longitudinal edges, with a top longitudinal closure.

9. The lamella of claim 1, in which, for each of the longitudinal straight ribs of which the plate consists, a V-shaped deflector is provided, the V-shaped deflectors being arranged in the flat portion of the top transverse fold.

10. The lamella of claim 4, wherein the bottom surface of the flat portion of the top part is provided a plurality of protrusions, each of the protrusions being aligned with one of the longitudinal straight folds or one of the longitudinal straight structural folds of the plate.

11. A lamellar module for a clarifier, comprising two or more lamellae according to claim 1, arranged in a parallel manner without direct contact with one another and attached to a supporting element.

12. The lamellar module of claim 11, wherein the lamellae are arranged in such a way that:
   the bottom part of the plate of each of the lamellae has an inclination of between 65 and 80° relative to the horizontal and the intermediate part of the plate, comprised between the top transverse fold and the bottom transverse fold, has an inclination between 45 and 65° relative to the horizontal; and
   the flat portion of the top part of the plate of each of the lamellae forms an angle with the horizontal comprised in the range between 10° and −10°.

13. The lamellar module of claim 11, wherein:
   each of the lamellae is provided with at least one structural fold equipped with a top anchoring point that comprises a perforation closest to the top transverse fold and a bottom anchoring point that comprises a perforation located in the bottom part; and
   the supporting element comprises at least two groups of threaded rods, the first group of threaded rods being arranged so that they cross the perforations in the top anchoring point of the lamellae and the second group of threaded rods being arranged so that they cross the perforations in the bottom anchoring point of the plates of the lamellae.

14. The lamellar module of claim 13, further comprising:
   at least one top spacer, arranged at a top anchoring point of a lamella(S), the top spacer being provided with a through hole to allow at least one of the threaded rods of the first group to pass through the same; and
   at least one bottom spacer, arranged at a bottom anchoring point of a lamella, the bottom spacer being provided with a through hole to allow at least one of the threaded rods of the second group to pass through the same.

15. The lamellar module of claim 14, wherein the bottom spacers arranged in the vicinity of the bottom edge of the lamellae are preferably provided with coupling means for coupling to a supporting base.

16. The lamellar module of claim 12, wherein:
   each of the lamellae is provided with at least one structural fold equipped with a top anchoring point that comprises a perforation closest to the top transverse fold and a bottom anchoring point that comprises a perforation located in the bottom part; and
   the supporting element comprises at least two groups of threaded rods, the first group of threaded rods being arranged so that they cross the perforations in the top anchoring point of the lamellae and the second group of threaded rods being arranged so that they cross the perforations in the bottom anchoring point of the plates of the lamellae.

17. The lamellar module of claim 16, further comprising:
   at least one top spacer, arranged at a top anchoring point of a lamella, the top spacer being provided with a through hole to allow at least one of the threaded rods of the first group to pass through the same; and
   at least one bottom spacer, arranged at a bottom anchoring point of a lamella, the bottom spacer being provided with a through hole to allow at least one of the threaded rods of the second group to pass through the same.

18. The lamellar module of claim 17, wherein the bottom spacers arranged in the vicinity of the bottom edge of the lamellae are preferably provided with coupling means for coupling to a supporting base.

* * * * *

UNITED STATES PATENT AND TRADEMARK OFFICE
CERTIFICATE OF CORRECTION

PATENT NO. : 12,257,532 B2  
APPLICATION NO. : 18/695863  
DATED : March 25, 2025  
INVENTOR(S) : Pedro Roberto Rodríguez Gómez Page 1 of 1

It is certified that error appears in the above-identified patent and that said Letters Patent is hereby corrected as shown below:

In the Claims

Column 15, Line 38, Claim 14, delete "lamella(S)," and insert -- lamella, --

Signed and Sealed this  
Thirteenth Day of May, 2025

Coke Morgan Stewart  
*Acting Director of the United States Patent and Trademark Office*